Figure 1:
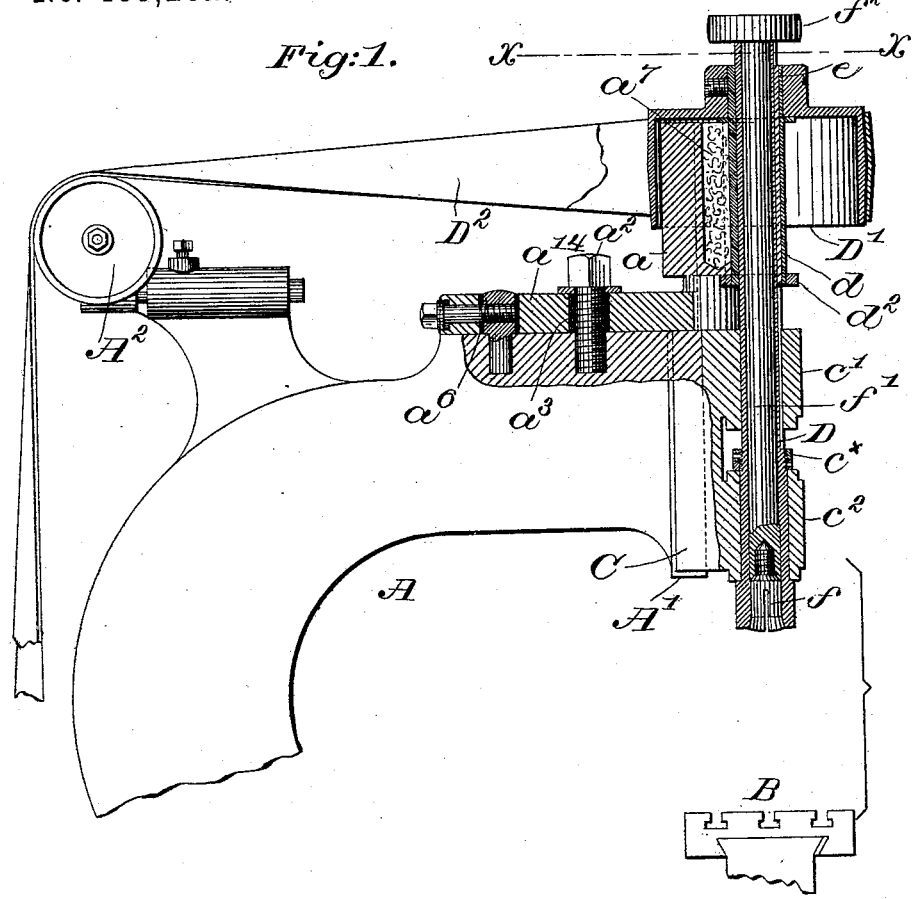

(No Model.)

J. BECKER.
MILLING MACHINE.

No. 489,282. Patented Jan. 3, 1893.

Witnesses.
Fred N. Ashworth
Louis N. Lowell

Inventor.
John Becker.
by Crosby & Gregory
Attys.

UNITED STATES PATENT OFFICE.

JOHN BECKER, OF FITCHBURG, MASSACHUSETTS.

MILLING-MACHINE.

SPECIFICATION forming part of Letters Patent No. 489,282, dated January 3, 1893.

Application filed March 25, 1892. Serial No. 426,333. (No model.)

*To all whom it may concern:*

Be it known that I, JOHN BECKER, of Fitchburg, county of Worcester, State of Massachusetts, have invented an Improvement in Milling-Machines, of which the following description, in connection with the accompanying drawings, is a specification, like letters on the drawings representing like parts.

The spindles of milling machines now commonly in use are rotated in rigid bearings and the fastest of them are not run at a speed above one thousand rotations per minute. It is not practicable as milling machines are now constructed to run the spindle at a speed above one thousand rotations per minute, or even that, for at such speed the belts have to be taut and the tight belt and high speed cause heating of bearings and spindle, and the rapid wear of both, and what is of the greatest importance, the taut belt tends to deflect the spindle from its proper vertical position. In this stage of machine construction it is a great desideratum to run the parts at the highest possible speed consistent with good work. It is well known that with small cutters a very much greater variety of work can be done than with larger cutters, yet as milling machines prior to my invention have been constructed, it has not been practical to employ small cutters because to operate efficiently they must be rotated at high speed, and the spindle must always be vertical to the platen or work-support, the speed varying for the particular class of work and the size or delicacy of the cutter. With these facts in mind I have by experiment devised a milling machine in which the practical speed of rotation of the spindle may be any where from five hundred to three thousand rotations per minute. To do this, in addition to its usual bearings, I have provided the milling spindle with an adjustable auxiliary bearing located in the line of the belt pull, its function and purpose being to prevent tipping or deflection of the spindle due to the strain of a belt kept sufficiently taut to insure high speed, and to release the usual bearing from much of the wear that it is commonly subjected to when the belt strain is resisted by one half of the usual bearing. In my improved construction the wearing surface of the auxiliary bearing, located in the line of the belt pull, may be adjusted in a horizontal plane toward and from the center of rotation of the spindle, so that the spindle may be made to run in its main bearings with a loose as contradistinguished to a close fit, or in other words, the extent of the pressure between the spindle and the auxiliary bearing may be regulated by adjusting the auxiliary bearing, and it is possible to conceive the spindle running in its main bearings with a hundredth or a thousandth of an inch clearance if the auxiliary bearing, affixed to and in the line of the belt pull, be adjusted with sufficient accuracy.

The spindle carrier in this present embodiment of my invention is represented as a hollow shaft adapted to be actuated by a belt pulley recessed to receive between its periphery and the center of rotation of the spindle, an auxiliary bearing which supports the said spindle as against lateral movement or tipping in the line of the belt pull. For the best results, this auxiliary bearing will be made adjustable in a horizontal plane so as to place its vertical acting face in proper relation to the center of the main bearing for the spindle, which, as herein shown, is made as a box located below the auxiliary bearing and connected with the usual sliding carriage, the vertical movement of which controls the vertical movements of the spindle and its attached milling tool.

My invention consists in a milling machine containing the following instrumentalities, viz:—a rotating spindle, a main bearing therefor, a co-operating pulley to rotate the spindle, and an auxiliary bearing located in the space between the periphery of the said pulley and the spindle and in the line of the belt pull, to operate, substantially as will be described.

Other features of this invention will be hereinafter described and pointed out at the end of this specification.

Figure 3:
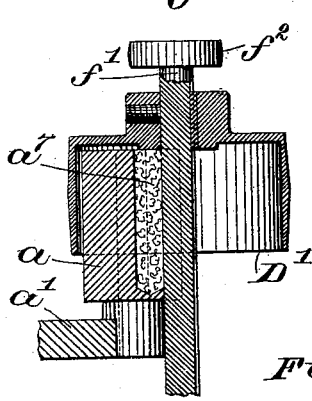
Figure 2:
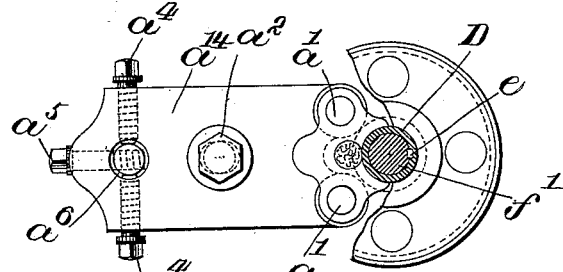
Figure 4:
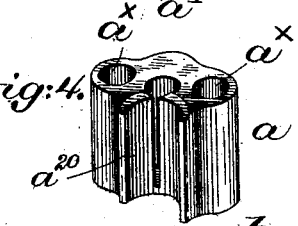

Figure 1, in sectional side elevation represents a sufficient portion of a vertical milling machine with my improvements added to enable my invention to be understood, the figure showing a portion of the platen or work-support. Fig. 2, is a partial view below the section line $x$, Fig. 1, of the auxiliary bearing with part of the pulley broken out. Fig. 3, is a modification to be described; and Fig. 4 shows the auxiliary bearing in perspective.

The frame-work A, having the guide or track A' at the end of its overhanging arm; the carriage C grooved to embrace the guide or track, and adapted to be adjusted vertically thereon; and the platen or work-support or bed B, are and may be all as usual in milling machines, and in practice the carriage may have combined with it any usual device by which to effect the vertical feeding in the ascent and descent of the spindle, and the platen may have combined with it any devices commonly used in milling machines for such purpose.

The carriage C has two boxes $c'$, $c^2$ which constitute the main bearing for the spindle D. This spindle is shown as hollow, and as provided at the box $c^2$ with a collar $c^x$, which, by contact with the box $c^2$ of the main bearing, supports the weight of the spindle. The spindle will preferably have a substantial, but it may yet be loose fit in the bearing boxes $c'$, $c^2$. The spindle has combined co-operatively with it an auxiliary bearing $a$, having a concaved face or seat; it as shown, being provided at one end with holes $a^x$ to fit over the studs $a'$ on the foot $a^{14}$ of the auxiliary bearing stand. The auxiliary bearing will preferably be provided with a groove for the reception of an oil supply shown as a wick $a^7$. The bearing stand has, as shown, a hole $a^3$ which is entered by a set screw $a^2$ of smaller diameter, in order that the auxiliary bearing may be adjusted horizontally when the set screw is loose. I prefer, however, to combine with this auxiliary bearing, devices, as screws $a^5$, $a^4$, whereby it may be adjusted positively and powerfully as may be desired, the set screw $a^2$ being employed to confine the bearing in its adjusted position. The belt pulley D', and the spindle, are so connected and combined, as by a spline or groove, as to enable the spindle to be moved vertically toward and from the platen, but without the said pulley rising and falling with it. The spline is shown by the letter $e$. The pulley D' is chambered at one side to receive the auxiliary bearing, as shown in Fig. 1, and to bring the said bearing inside that part of the pulley surrounded by the belt $D^2$ so that the said auxiliary bearing supports the spindle in the line of the belt pull. The belt $D^2$ is passed over idle pulleys $A^2$, and in practice said belt may be driven in any manner common to vertical milling machines.

In Figs. 1 and 2, I have shown as I prefer the pulley D' as provided with a long hub $d$ which enters and fits the concavity $a^{20}$ of the auxiliary bearing $a$, the hub being interposed between the spindle and auxiliary bearing, the hub having a collar $d^2$ to engage a part of the auxiliary bearing to thus overcome any tendency of the pulley rising with the spindle It is not, however, intended to limit this invention to the employment of the long hub, as it may be entirely omitted, as in Fig. 3, and yet my invention would be preserved in a construction so modified, and in so far as the auxiliary bearing is concerned as a support for the spindle in the line of the pull of the belt. The use of the long hub materially lessens the wear on the spindle. The auxiliary bearing referred to may be so adjusted as to take substantially all the friction due to the pull of the belt and let the spindle run in the main bearings $c'$, $c^2$, in such manner as to touch or barely touch, or so as not to touch at all, and consequently the bearings $c'$, $c^2$ will not heat or wear, and what is of the greatest practical importance in operation, the spindle may be kept vertical to the face of the platen or support B however taut the belt and the speed of the spindle.

I have shown the tool holding clutch $f$ as split at its lower end, and as having a threaded shank to be engaged by a rod $f'$ having a milled head $f^2$, the rotation of the rod enabling the clutch to be drawn into the lower end of the spindle when it is desired to clamp the shank of a tool, or vice-versa.

In another application, Serial No. 397,510, filed by me on the 25th day of June, 1891, now Patent No. 474,898, dated May 17, 1892, I have shown and claimed a milling machine having roller bearings for its spindles, but in this case the bearing surface is not a roll.

The invention herein contained is not limited to the exact shape shown for the auxiliary bearing.

Having described my invention, what I claim and desire to secure by Letters Patent; is:—

1. In a milling machine, the spindle and its common fixed bearings for supporting it beyond the driving pulley, combined with such driving pulley and an auxiliary bearing arranged in the line of pull on said pulley, substantially as described.

2. In a milling machine, the spindle and its common fixed bearings for supporting it beyond the driving pulley, combined with such driving pulley, an auxiliary bearing arranged in the line of pull on said pulley, and means to adjust such auxiliary bearing relatively to the spindle, substantially as described.

3. In a milling machine, the spindle and its common fixed bearings for supporting it beyond the driving pulley, combined with such driving pulley, a hub on the pulley, and an auxiliary bearing arranged in the line of pull on said pulley and acting against said hub, substantially as described.

In testimony whereof I have signed my name to this specification in the presence of two subscribing witnesses.

JOHN BECKER.

Witnesses:
FREDERICK L. EMERY,
FRANCES M. NOBLE.